United States Patent [19]
Elliott et al.

[11] 4,292,213
[45] Sep. 29, 1981

[54] CATALYST AND SOLVENT FREE EPOXY MATERIALS

[76] Inventors: Margaret L. Elliott; Mary J. Wright, both of 922 W. Buchanan, Phoenix, Ariz. 85007

[21] Appl. No.: 945,785

[22] Filed: Sep. 25, 1978

Related U.S. Application Data

[63] Continuation of Ser. No. 820,168, Jul. 29, 1977, abandoned.

[51] Int. Cl.$^3$ .................. B29H 19/00; C08J 5/24; C08G 30/14
[52] U.S. Cl. .................. 260/2.3; 260/18 EP; 260/18 PN; 260/29.8; 260/30.4 EP; 260/37 EP
[58] Field of Search ............ 260/18 EP, 29.8, 18 PN, 260/47 EN, 830 TW, 2.3, 37 EP, 837, 30.4 EP; 528/1, 2, 3

[56] References Cited

U.S. PATENT DOCUMENTS

| | | | |
|---|---|---|---|
| 2,783,213 | 2/1957 | Beau | 260/2.3 |
| 2,853,742 | 9/1958 | Dasher | 260/2.3 |
| 2,897,733 | 8/1959 | Shuger | 260/830 TW |
| 2,934,452 | 4/1960 | Sternberg | 260/18 PN |
| 3,265,647 | 8/1966 | Schaeffer et al. | 260/18 PN |
| 3,557,056 | 1/1971 | Peerman | 260/47 EN |
| 3,666,695 | 5/1972 | Jachimowicz et al. | 260/830 TW |
| 3,976,613 | 8/1976 | Schinabeck | 260/37 EP |
| 4,039,627 | 8/1977 | Katsimbas | 260/836 |

OTHER PUBLICATIONS

Derwent Publication 00474w/01 of Jap. Kok J49057098.
Chem. Abs., vol. 81 (1974), 14116(b)-Tris(DMAM)-phenol-Hardner Epoxides.
Chem. Abs., vol. 84 (1976), 60602(s)-Epoxy Molding Comp.
Chem. Abs., vol. 89 (1978), 45202w-Epoxy Sealants.
Chem. Ab., vol. 86 [17689e] Epoxy Compositions.
Derwent Publication 72973w/44 of Jap. Kokai J49124-148.

*Primary Examiner*—Joseph L. Schofer
*Assistant Examiner*—Herbert J. Lilling
*Attorney, Agent, or Firm*—Warren F. B. Lindsley

[57] ABSTRACT

Improved catalyst and solvent free epoxy materials characterized by increased stability with aging and reduced shrinkage as the result of the use of an inert filler comprising cured rubber or a silica flour.

12 Claims, 7 Drawing Figures

CATALYST AND SOLVENT FREE EPOXY MATERIALS

CROSS REFERENCE TO RELATED APPLICATION

This application is a continuation of application Ser. No. 820,168, filed July 29, 1977 abandoned and entitled "Improved Epoxy Material."

BACKGROUND OF THE INVENTION

In a wide variety of industrial, commercial and military environments, the ordinary concrete, asphalt, wood or other working surfaces are inadequate to withstand the punishing weather and the day-to-day use to which they are subjected to. Loading docks and sidewalks in shipyards, railroad yards, factories and the like are constantly battered, chipped and cracked by the impact of heavy objects such as grappling hooks, heavy clevices, chains, metal containers and frequently by the lugs of steel wheeled machinery. Highway surfaces under the influence of weather and heavy use become cracked and pitted, sections are popped out and joints opened up creating increased vulnerability to further damage.

An example of particularly hard use and severe impact to a working surface is the deck surface on an aircraft carrier in the area immediately under the aircraft arrestor cables and grappling hooks as well as similar landing strips at airports which are utilized in the landing of planes. Such surfaces are ordinarily paved with specially-formulated reinforced concrete but they must nevertheless be replaced all too frequently at great costs and loss of operating time for the carrier and similarily used land based air strips.

Of the numerous alternatives that have been considered and tested for this and similar applications, one broad group or family of materials that has offered more promise than most encompasses a variety of epoxy-based materials.

Epoxy resins have many valuable properties which suit them admirably for such applications. They adhere well to nearly any surface, cure easily, exhibit low shrinkage, are chemically inert, heat and moisture resistant, hard and have an unusual degree of flexibility and impact resistance.

All resins of this type contain the epoxy atomic group in which an atom of oxygen is linked by two of the atoms in a carbon chain as, for example, in the case of ethylene oxide. They are formed in a process of polymerization or epoxidation that begins most typically with bisphenol A and epichlorohydrin as raw materials. These substances polymerize to form low-molecular weight chains. The action of a curing agent, usually a polyamine or a polyamide, links and extends the chains. Because no volatile product is split out during these reactions, there is minimal shrinkage. Other monomers containing the epoxy group and other curing agents also can be used. Special catalysts and other additives are employed including polysulphides, polyamines, amino and phenolic resins.

The McGraw-Hill Encyclopedia of Science and Technology (1971) describes epoxidation as a process by which olefinic material may be converted to opoxy (oxirane) compounds by a variety of methods. These methods include direct oxidation in the presence of silver catalysts, dehydrochlorination of chlorohydrins and reaction with peracids. The last method is most commonly employed. Depending on the peracid used and reaction conditions, the reaction may proceed beyond the formation of epoxy compounds with the production of hydroxyacyloxy compounds or glycols.

Great strides have been made in recent years in the development of improved epoxy materials, but for the applications of interest here, even the best formulations fall short of performance goals. While shrinkage is indeed minimal it is typically excessive for application as a surface over large areas because of the cracking and separation that inevitably results. An additional limitation is the universal tendency of currently available epoxy materials to lose their initial flexibility as aging progresses. This is believed to result from the use of catalysts such as polysulphides whose activity continues throughout the useful life of the material. A parallel example is the eventual loss of strength in concrete as it ages excessively, eventually crumbling and falling apart.

It thus becomes apparent with support from experience that further improvements in epoxy materials are essential to their successful application in the difficult service herein addressed.

SUMMARY OF THE INVENTION

In accordance with the invention claimed, an improved group or family of epoxy materials is provided which are particularly well-suited for use as high-impact surfaces for roadways, industrial and commercial working surfaces, aircraft arrestor cable barriers, and the like. The improved characteristics are achieved through the elimination of catalysts in the epoxidation process.

It is, therefore, one object of this invention to provide a family of improved epoxy materials for a broad range of applications.

Another object of this invention is to provide a group or family of epoxy materials that exhibits a significantly lower degree of shrinkage during initial cure and throughout its useful life.

A further object of this invention is to provide such a group or family of epoxy materials in which the initial degree of flexibility and resilience persists without diminution throughout the long and useful life of the material.

A still further object of this invention is to achieve these improved characteristics through the elimination of the catalysts such as polysulphides which are normally employed in the epoxidation process and through the exclusive employment of 100% reactive constituents.

A still further object of this invention is to provide an improved epoxy material employing cured rubber and silica flour individually and in combination as an inert filler.

Yet another object of this invention is to provide such a group or family of materials which are non-toxic, non-irritating and non-combustable and which contain no volatile solvents.

Further objects and advantages of the invention will become apparent as the following description proceeds and the features of novelty which characterize this invention will be pointed out with particularly in the claims annexed to and forming a part of this specification.

BRIEF DESCRIPTION OF THE DRAWINGS

The present invention may be more readily described by reference to the accompanying drawing in which:

FIG. 7 is a block diagram of a still further adaptation of the material of the invention for use as a durable paint for highways, floors, walks and the like.

DESCRIPTION OF THE PREFERRED EMBODIMENT

Figure 1:
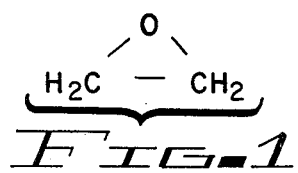
FIG. 1 is an illustration of a typical epoxy atomic group.

Referring more particularly to the drawing by characters of reference, FIG. 1 illustrates the chain structure including atoms of carbon and oxygen which is characteristic of all epoxy based materials including epoxy resins which adhere well to many types of surfaces, cure easily, exhibit low shrinkage, are chemically inert, heat and moisture resistant and have a marked flexibility and impact resistance. Resins of this type contain the epoxy group, in which an atom of oxygen is linked to both of two adjacent carbon atoms of a carbon chain as shown in FIG. 1 in the same way as it is in the ethylene oxide molecule.

Generally speaking, an epoxy resin comprises a polyester resin of a class of thermosetting materials formed by the polyerization of suitable epoxides such as ethylene oxide used chiefly heretofore in coating and adhesives.

Figure 2:
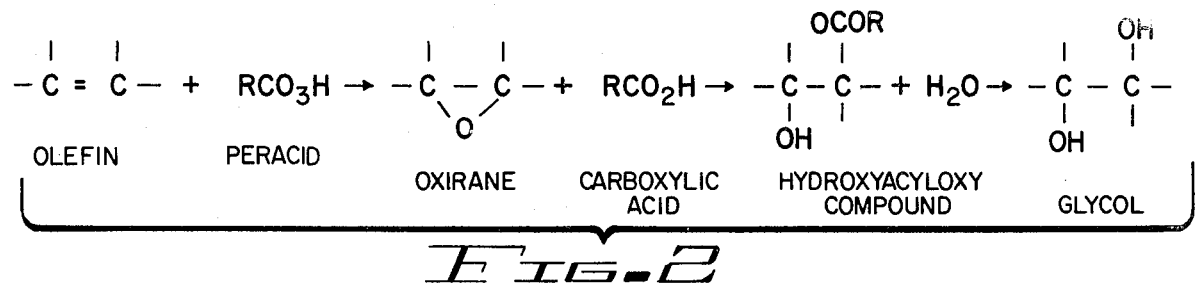
FIG. 2 is a reaction diagram for the formation of conventional epoxy materials.

Olefinic material may be converted to simple epoxy (oxirane) compounds by a variety of methods, such as direct oxidation in the presence of silver catalysts, dehydrochlorination of chlorohydrins and, commonly, reaction with peracids. Depending on the peracid used and the conditions, the reaction may proceed further, with the reactive epoxy group forming hydroxyacyloxy compounds or glycols, and shown by the equation illustrated in FIG. 2 of the drawing. This continued reaction erodes the initially desirable characteristics of the material. Thus an initially pliable or flexible material becomes brittle and hard. In addition it produces shrinkage and emission of toxic gasses.

Much of the responsibility of this undesirable continued reaction or material aging is due to the use of the various catalysts in the encouragement of the initial reaction. Also to blame is the incomplete reaction at the first stage of the component materials.

Thus it is the object of the invention to provide new epoxy resin compositions of high impact resistance and broad applicability, which undergo less shrinkage during curing and useful life than known compositions, exhibit no deterioration of their initial flexibility and resilience, provide satisfactory bonding to asphalt and concrete, and which can be prepared from easily available starting materials.

Figure 3:
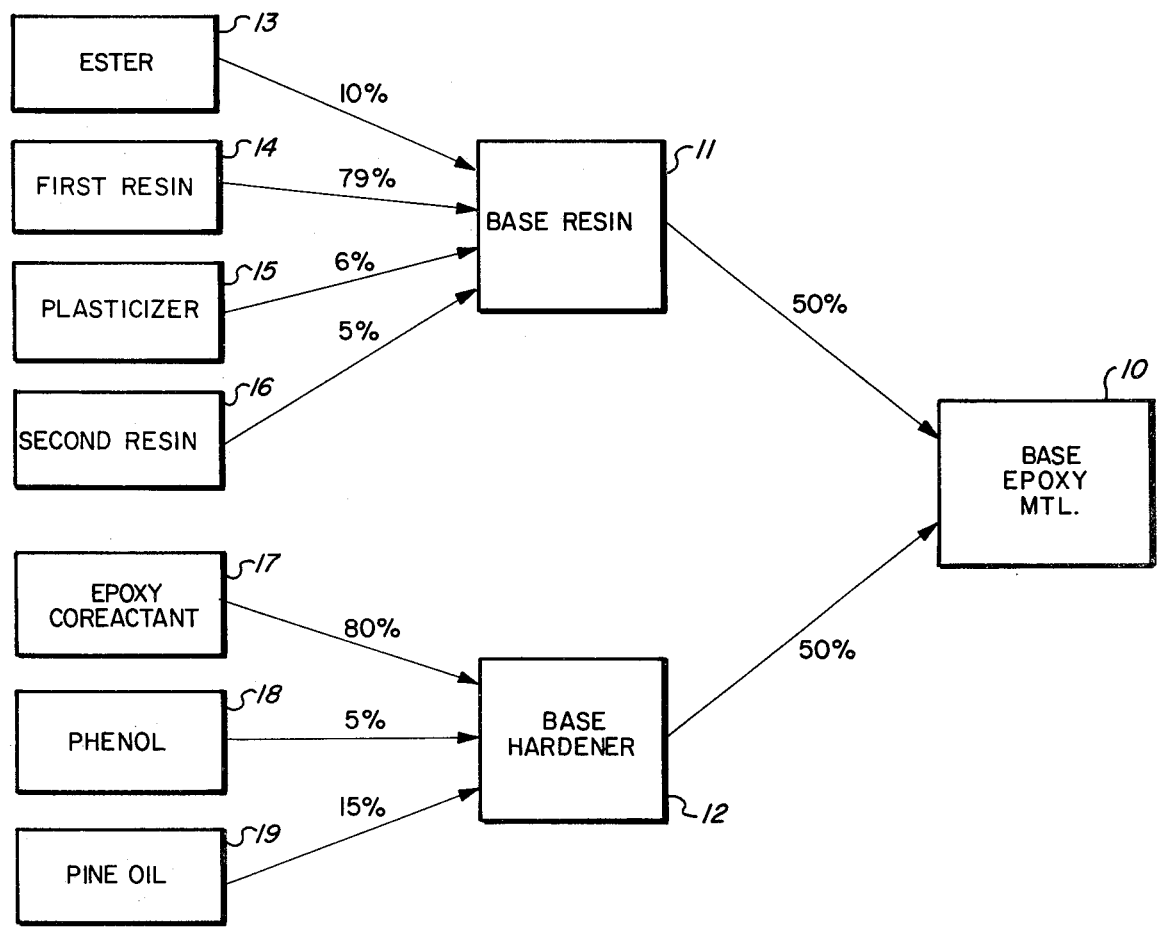
FIG. 3 is a block diagram illustrating the formulation and combination of the basic materials utilized in the formation of the base epoxy material of the invention.

This object is achieved in accordance with the present invention as illustrated in FIG. 3 of the drawing by providing an amine hardened epoxy resin composition based on epichlorohydrin/bisphenol A, which is produced by the process of:

(a) mixing together by weight approximately 10% of an ester 13, approximately 79% of a first resin, approximately 6% of a plasticizer and approximately 5% of a second resin 16 to form a base resin 11, (b) mixing together by weight approximately 80% of an epoxy co-reactant 17, approximately 5% of a phenol 18 and approximately 15% of a pine oil 19 to form a base hardener 12, and (c) mixing together said base resin 11 and said base hardener 12 and allowing the mixture to cure.

The ester 13 comprises a high-boiling glycidyl ester of a tertiary, saturated carbon-chain substituted, carboxylic acid, having an epoxide equivalent weight of 240 to 250. The first resin 14 is an epichlorohydrin/bisphenol A liquid resin having an epoxide equivalent weight of 182 to 194. The plasticizer 15 is a mixture of the monoglycidyl ether derivatives of the $C_{15}$-alkyl phenols obtained from cashew nut liquid, having an epoxide equivalent weight of about 490. The second resin 16 is an epichlorohydrin/bisphenol A liquid or solid resin having an epoxide equivalent weight of about 390 to 500, preferably 390 to 470. The co-reactant 17 is a very low viscosity, resinous amidoamine adduct having an amine value of about 450. The phenol 18 is a tri(dimethylaminomethyl) phenol, and the pine oil 19 is suitable for masking the smell of the epoxy resin.

The above-specified starting materials are known to those skilled in the art and are commercially available.

An ester such as ester 13 preferably used in forming the base resin is available under the trade name CARDURA ® E (Shell Chemical Company, One Shell Plaza, Box 2463, Houston, Tex. 77001). This product may be regarded in general as a fatty acid monoglyceride anhydride of the formula

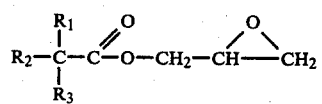

having a boiling point of 275° C. The α-carbon atom is sterically hindered by 3 saturated carbon chains.

The first resin 14 used in forming the base resin has an epoxide equivalent weight in the range 182 to 194, preferably 184 to 194 and, most preferably, 187 to 191. Such a suitable resin is available under the trade name GENEPOXY ® 190 (General Mills Chemicals, Inc., 4620 East 77th St., Minneapolis, Minn. 55435) and has a viscosity of 11.0 to 14.0 Pas/25° C. and a specific gravity of 1.18. Another resin is available under the trade name EPON ® 828 (Shell Chemical Company, U.S.A.) or under the trade name Epikote ® 828 (Deutsche Shell Chemie GmbH, 6 Frankfurt/Main, Nibelungenplatz 3, Germany) and has a viscosity of 10.0 to 15.0 Pas/25° C., and average molecular weight of 370 and a specific gravity of 1.17. GENEPOXY ® 185 is also usable. This has a viscosity of 7.0 to 10.0 Pas/25° C. and a specific gravity of 1.16.

A suitable plasticizer 15, usable in forming the base resin, is available under the trade name Cardolite ® Epoxy Resin Flexibilizer and Reactive Diluent NC-513 )3M Company, 3M Center, St. Paul, Minn. 55101).

A suitable second resin 16, preferably used in forming the base resin, is available under the trade name EPON ® 871 (Shell Chemical Company, U.S.A.) or under the trade name Epikote ® 871 (Deutsche Shell Chemie GmbH, Germany) and has a viscosity of 0.4 to 0.9 Pas/25° C. and a specific gravity of 0.988. This material has also been available as a solid resin.

A suitable co-reactant 17, preferably used in forming the base hardener, is available under the trade name GENAMID ® 250 from General Mills Chemicals, Inc. and has a viscosity of 0.5 to 1.0 Pas/25° C.

A suitable phenol 18, preferably used in forming the base hardener, is 2, 4, 6-tri(dimethylaminomethyl) phenol. This product is available, for example, under the trade name DMP-30 ® (Rohm and Haas Company, Independence Mall West, Philadelphia, Pa. 19105) or under the trade name DION ® hardener EH-30 (Diamond Shamrock Chemical Company, 300 Union Commerce Building, Cleveland, Ohio 44115).

The pine oil component 19 of the base hardener is added primarily to modify the odor of the resin composition, but it also acts as an additional plasticizer.

In a preferred embodiment of the invention the starting materials are selected from the above specified commercial products. The base resin and the base hardener are mixed together preferably in a proportion of equal parts by weight (50%:50%), although the mixing ratio may vary by 50% or even more.

It has been found that known epoxy compositions exhibit a deterioration of their desirable characteristics in the course of aging because certain catalysts, such as polysulphides, which are normally employed for promoting the initial reactions, continue to be active within the composition throughout its useful life. Thus an initially pliable or flexible material becomes brittle and hard, shrinkage occurs and toxic gases are emitted. Reactions which are still imcomplete at the time of use of the composition may also lead to subsequent changes of properties. The epoxy resin compositions of the present invention are therefore formed in the absence of damaging catalysts. The constituents employed are 100% reactive.

Intentionally absent from both resin 11 and hardener 12 is any form of catalyst as required in other epoxy formulations to promote the reaction between resin and the hardener. The particular combination of materials shown, however, reacts readily and completely without the aid of a catalyst, a one-to-one mixture of resin 11 and hardener 12 produces a flexible, rubber-like base epoxy material 10. Material 10 is unique as an epoxy material in terms of its stability and low shrinkage. It maintains its initial plasticity and flexibility throughout its long and useful life and its shrinkage upon curing is less than 0.01% of the original liquid volume. These superior characteristics are ascribed, at least partly, to the absence or harmful catalysts. The particular selection and formulation of the constituents, which is not suggested by the prior art, is also considered to contribute to this result. In addition, the complete reaction of all constituents and again the omission of the catalyst and specifically the absence of any polysulfides results in a material which is non-toxic, non-irritating, exhudes no volatile gasses and is non-combustible.

The base resin and the base hardener of the present invention have an indefinite shelf life prior to mixing and are water-soluble. The mixture has a pot life of about one hour and can be applied over damp surfaces and trace amounts of grease and oil. It may include organic or mineral coloring materials. The mixture will set below freezing point. At ordinary temperatures it sets within a few hours, although higher temperatures accelerate the process. The cured composition adheres to asphalt as well as to concrete and will not become tacky under the action of heat.

The basic epoxy composition described above may be used directly as a flexible molding material and its surface may be shaped to form patterns of very fine and intricate detail.

The base resin and the base hardener, as formed in the present invention, may be supplemented with fillers and other additives in order to yield desirable characteristics of the final composition for other applications.

FIGS. 4–7 show the adaptations employed for four members of a group or family of epoxy materials, each of which is formed by employing approximately equal parts by weight of resin 11 and hardener 12 along with other materials.

Figure 4:
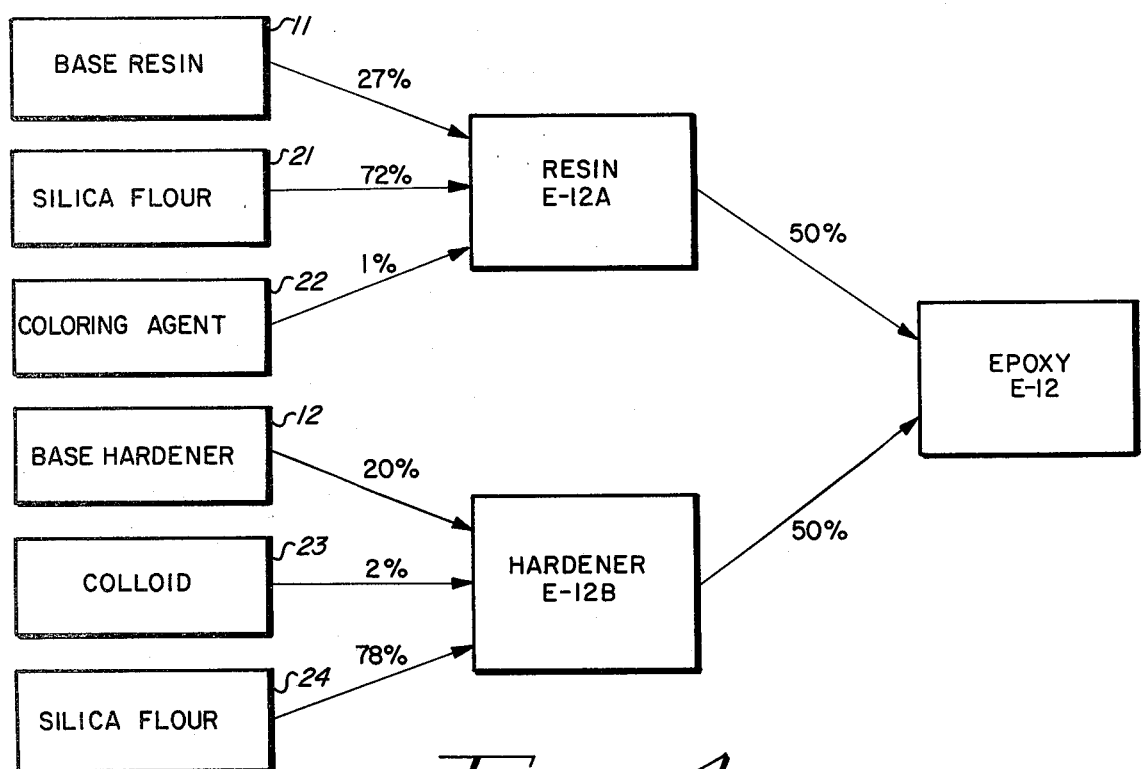
FIG. 4 is a similar block diagram illustrating the formulation of an adaptation of the epoxy material of the invention for use in the repair or resurfacing of concrete and asphalt.

In FIG. 4, an epoxy material E-12 is shown to comprise equal parts by weight of a resin E-12A and a hardener E-12B, the resin and the hardener having been prepared by modification, respectively of base resin 11 and base hardener 12 of FIG. 3.

This epoxy resin composition E-12 may be produced by:

(a) mixing the base resin 11 with silica flour 21 and a coloring agent 22 in a proportion of approximately 27%:72%:1% by weight, respectively, to form a base resin mixture E-12A, (b) mixing the base hardener 12 with silica flour 24 and a colloid 23 in a proportion of approximately 20%:78%:2% by weight, respectively, to form a base hardener mixture E-12B, and (c) mixing said base resin mixture with said base hardener mixture in a proportion of approximately 50%:50% by weight.

The silica flour 21, as used above, consists of equal parts by weight of 140 mesh, 200 mesh and 325 mesh (corresponding to mesh apertures of 0.105, 0.074 and 0.044 mm, respectively) silica flour and acts as an inert filler which keeps the resin composition from becoming brittle. It also acts as a heat absorbent during the reaction between the base resin mixture 11 and the base hardener mixture 12. The coloring agent 22 serves to identify the base resin mixture in order to distinguish it from other materials during its application by the end user.

The colloid 23 used in preparing the base hardener mixture E-12B serves as a thickener, extender or suspension agent. A suitable material is very fine $SiO_2$ powder. A preferred colloid is available commercially under the trade name Cab-o-Sil ® (Cabot Inc., Boston, Mass.) and consists of fine white $SiO_2$-powder having a density of 2.1 g/cm$^3$ and a particle size of 0.015 to 0.020 μm. The colloid increases the viscosity of the base hardener mixture and prevents the silica flour from settling out during the reaction period.

The above end product, which is designated Epoximide E-12, is a flexible epoxy resin composition suitable for the repair of spalling, cracking, pitting and other damage to concrete and asphalt. It can be used to join concrete to asphalt and to resurface concrete floors, tanks and water reservoirs. Wood and metal surfaces may also be coated with this composition.

Figure 5:
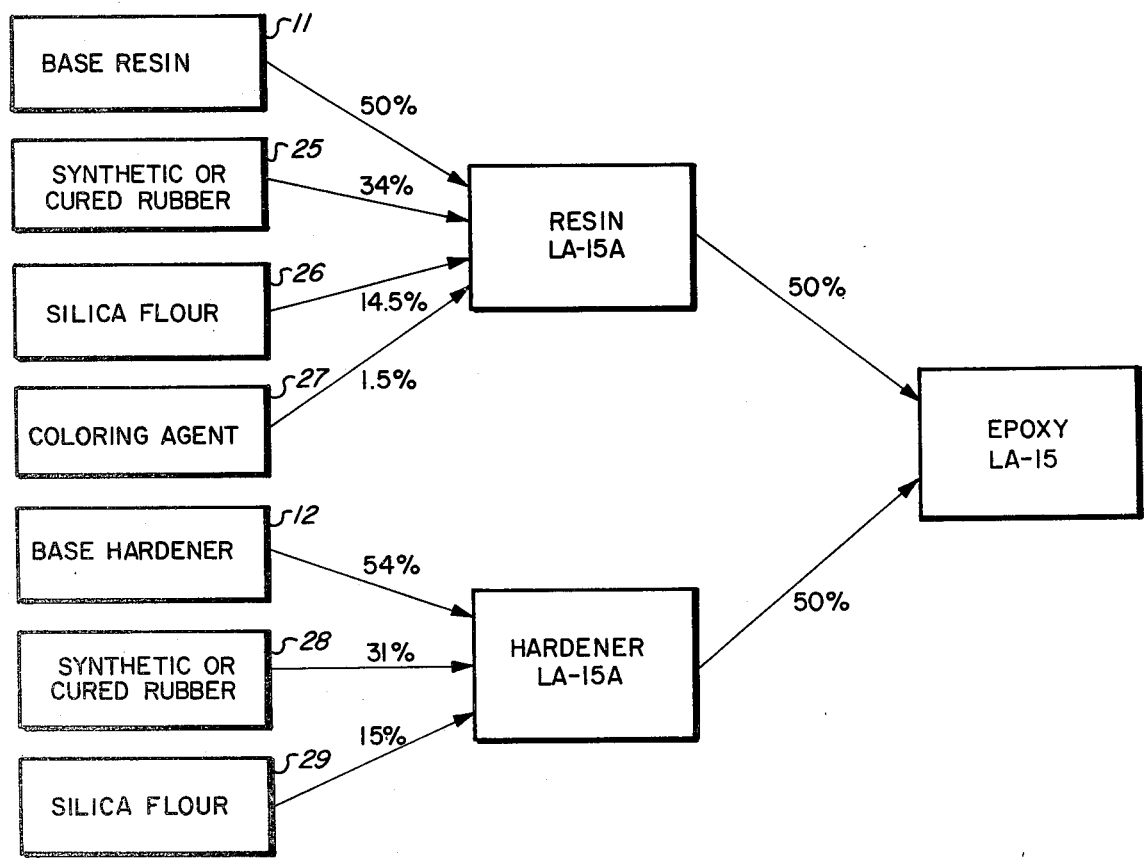
FIG. 5 is a block diagram illustrating the formulation of another adaptation of the material of the invention for use as a heavy-duty paving material for applications such as aircraft cable-barrier inlays.

In FIG. 5, an epoxy material LA-15 is shown to comprise equal parts by weight of a resin LA-15A and a hardener LA-15B. This product and its component parts are again formed by modification, respectively, of base resin 11 and base hardener 12.

The epoxy composition of this embodiment is formed by:

(a) mixing the base resin 11 with synthetic rubber 25, silica flour 26 and a coloring agent 27 in a proportion of approximately 50%:34%:14.5%:1.5% by weight, respectively, to form a base resin mixture LA-15A, (b) mixing the base hardener 12 with synthetic rubber 28 and silica flour 29 in a proportion of approximately 54%:31%:15% by weight, respectively, to form a base hardener mixture LA-15A, and (c) mixing the base resin mixture LA-15A with the base hardener mixture LA-15A in a proportion of approximately 50%:50% by weight.

The synthetic rubber, as used above, consists preferably of equal parts by weight of polybutadiene, oil extended butadiene-styrene copolymer, polychloroprene, polyisobutyrene and polysulphide rubber, while the silica flour is preferably the same as that used in preparing the epoxy composition E-12. While the silica flour again acts as an inert filler, the synthetic rubber additives participate in the reactions between the base resin mixture and the base hardener mixture and undergo chemical change during the process. The coloring agent is again employed in order to distinguish the material during use in the field. The epoxy resin composition produced in the above-described manner is designated LA-15.

This epoxy resin composition is suitable for use as a heavy-duty paving material and has been formulated specifically for use as a cable-barrier inlay or cable-arrester inlay as fitted to the deck of an aircraft carrier. The material is inlayed to a minimum depth of 5 cm covering the impact area. It bonds extremely well to cut-away concrete and metal surfaces, is chemically resistant to jet fuels, liquid oxygen, grease, acids and cleaning solvents, and is an unusually tough and resilient material.

It should be noted that cured rubber such as used for automobile tires may be substituted for the synthetic rubber additives mentioned above.

Figure 6:
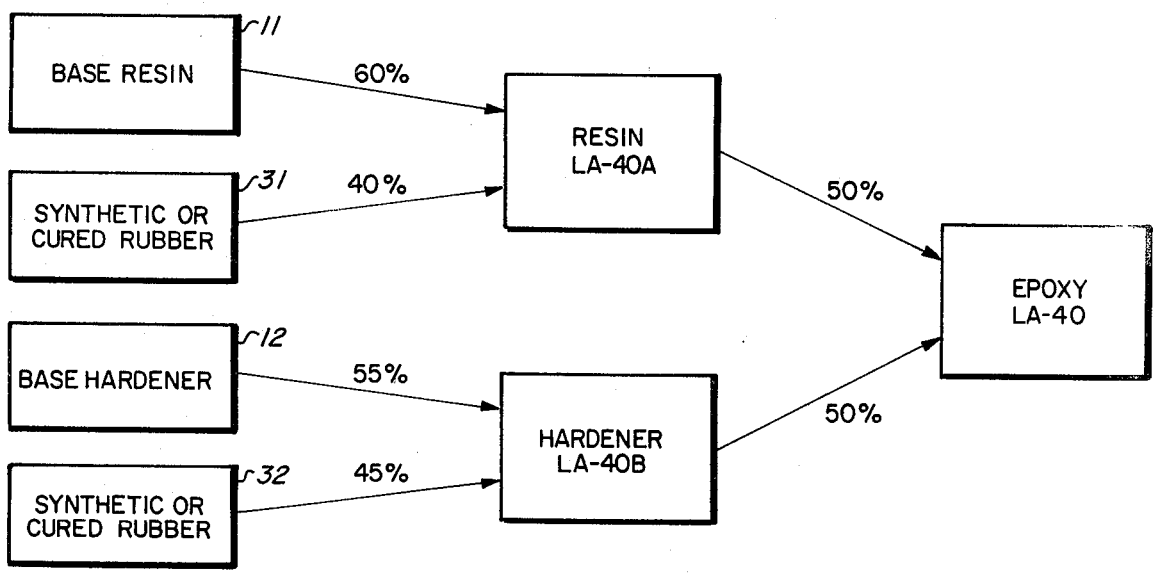
FIG. 6 is a block diagram illustrating a further adaptation of the material of the invention for use as a joint filler between sections of asphalt or concrete.

FIG. 6 illustrates the formulation of another epoxy material LA-40 which is an adaptation of the base epoxy 10 for use as a filler in concrete or asphalt joints where flexibility and adhesion are of primary importance. The epoxy LA-40 is obtained by combining equal parts by weight of the resin LA-40A and the hardener LA-40B wherein the resin and the hardener are again derived as modifications of base resin 11 and base hardener 12. This epoxy material may be produced by: (a) mixing the base resin 11 with cured or synthetic rubber 31 in a proportion of approximately 60%:40% by weight, respectively, to form a base resin mixture LA-40A, (b) mixing the base hardener 12 with cured or synthetic rubber 32 in a proportion of approximately 55%:45% by weight, respectively, to form a base hardener mixture LA-40B, and (c) mixing the base resin mixture LA-40A with the base hardener mixture LA-40B in a proportion of approximately 50%:50% by weight.

The synthetic rubber additives are the same as those previously described and they may be replaced with cured rubber such as recycled automobile tires and function in the same way in both cases.

The epoxy resin composition LA-40 is a modification of the base epoxy resin composition, adapted for use as a filler in concrete or asphalt joints, where flexibility and adhesion are of primary importance. This composition, with its high content of synthetic and or cured rubber materials is highly flexible and also resistant to jet fuel, liquid oxygen, grease, acid and cleaning solvents, so that it may be utilized in a wide variety of structures.

Figure 7:
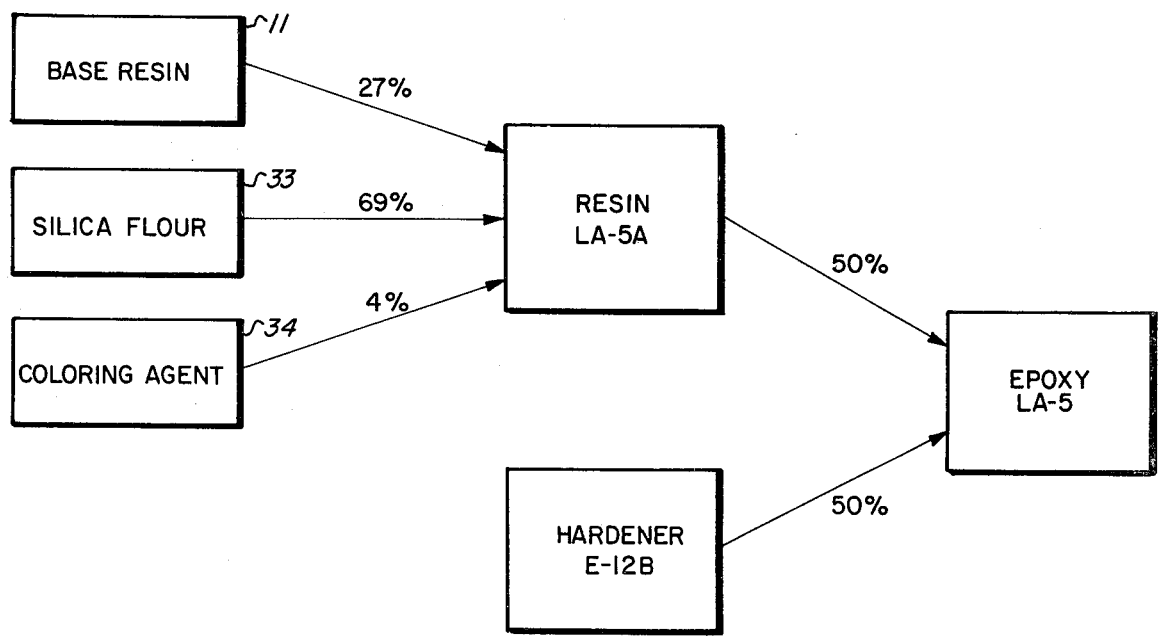

Yet another adaptation of the basic epoxy material is shown in FIG. 7 wherein an epoxy material LA-5 is seen to be comprised of equal parts by weight of a resin LA-5A and the same hardener E-12B that was employed in connection with epoxy E-12 of FIG. 4. This epoxy material LA-5 may be produced by:

(a) mixing the base resin 11 with silica flour 33 and a coloring agent 34 in a proportion of approximately 27%:69%:4% by weight, respectively, to form a base resin mixture LA-5A, and (b) mixing this base resin mixture LA-5A with the base hardener E-12B in a proportion of approximately 50%:50% by weight.

The base hardener E-12B employed in forming this composition is the same base hardener which is used in forming the basic epoxy resin composition E-12. The silica flour is preferably the same as that described above.

The epoxy resin composition LA-5 is a flexible, highly adherent and durable material, whcih is ideally suited for use as a paint for distinguishing traffic lanes on highways or work and safety zones on factory floors, or similar applications. The coloring agent may be selected as appropriate for the particular application.

Thus, In FIG. 3 a base resin 11 is formed from 10% of an ester 13, 79% of a first resin 14, 6% of a plasticizer 15 and 5% of a second resin 16, and a base hardener 12 is formed from 80% of a coreactant 17, 5% of a phenol 18 and 15% of pine oil 19, the individual constituents being as previously defined and the percentages being by weight. The base resin 11 and the base hardener 12 are stored separately until the final composition is required for application, when they are mixed together in suitable proportions, the curing being more rapid with higher proportions of the hardener. As shown in FIG. 1, equal parts by weight of the base resin 11 and the base hardener 12 are mixed together to give a curable base epoxy resin composition 10.

In FIG. 4 a base resin mixture E-12A is formed from 27% of the base resin 11, 72% of silica flour 21 and 1% of a coloring agent 22, and a base hardener E-12B is formed from 20% of the base hardener 12, 2% of a colloid 23 and 78% of silica flour 24, the individual constituents being as previously defined and the percentages being by weight. The base resin mixture E-12A and the base hardener mixture E-12B are again stored separately until the final composition is required, when equal parts of each are mixed together to give the curable epoxy resin composition E-12.

FIG. 5 a base resin mixture LA-15A is formed from 50% of the base resin 11, 34% of cured or synthetic rubber 25, 14.5% of silica flour 26 and 1.5% of a coloring agent 27, and a base hardener mixture LA-15A is formed from 54% of the base hardener 12, 31% of a cured or synthetic rubber 28 and 15% of silica flour 29, the individual constituents being as previously defined and the percentages being by weight. The base resin mixture LA-15A and the base hardener mixture LA-15B are again stored separately until the final composition is required for application, when equal parts of each are mixed together to give the curable epoxy resin composition LA-15.

In FIG. 6 a base resin mixture LA-40A is formed from 60% of the base resin 11 and 40% of synthetic rubber 31, and a base hardener mixture LA-40B is formed from 55% of the base hardener 12 and 45% of synthetic rubber 32, the individual constituents being as previously defined and the percentages being by weight. The base resin mixture LA-40A and the base hardener mixture LA-40B are again stored separately until the final composition is required for application, when equal parts of each are mixed together to give the curable epoxy resin composition LA-40.

In FIG. 7 a base resin mixture LA-5A is formed from 27%(wt.) of the base resin 11, 69% of silica flour 33 and 4% of a coloring agent 34. When the final composition is required, a mixture is prepared of equal parts by weight of the base resin mixture LA-5A and a base hardener LA-5B, this base hardener being identical with the base hardener 12 as prepared in FIG. 1, to give the curable epoxy resin composition LA-5. The silica flour is as defined previously.

All of the final epoxy resin compositions described, including the base epoxy resin composition 10 and the epoxy resin compositions E-12, LA-15, LA-40 and LA-5 as well as other modified forms of the base constituents not described are of high durable stability, mechanical strength and resilience and exhibit low shrinkage and resistance to reaction of chemicals. The component materials are non-toxic, non-irritating, non-combustible and they contain no volatile solvents. They may be applied at virtually any temperature, although the rate of curing is very slow below freezing point. A layer of the curable epoxy resin composition of the present invention of 5 cm thickness will cure in about 8 hours at 10° C. and in about 6 hours at 21° C. Curing is accelerated at higher temperatures, for example 60° C. If a solid resin is used as the second resin, consideration should be given to the melting point of the solid resin. For example, if the solid resin selected is that available under the trade name EPON® 1001 or Epikote® 1001, then curing should be made above 70° C. Equipment used may be cleaned with soap and water or with steam.

Thus, a highly versatile and improved group of epoxy resin compositions is provided, in accordance with the stated object of the invention.

Although but a few embodiments of the invention have been illustrated and described, it will be apparent to those skilled in the art that various changes and modifications may be made therein without departing from the spirit of the invention or from the scope of the appended claims.

What is claimed is:

1. A process for preparing an amine-hardened epoxy material based on epichlorohydrin/bisphenol A comprising the steps of:
   mixing together by weight approximately 10% of an ester, approximately 79% of a first resin, approximately 6% of a plasticizer, and approximately 5% of a second resin to form a resin material,
   mixing said resin material with a filler selected from the group of cured rubber alone and in combination with silica flour and mixtures thereof in predetermined proportions by weight, respectively, to form a resin material mixture,
   if cured rubber is used as the filler the proportion is approximately 60%:40% by weight and if silica is used as the filler the proportion is approximately 27%:72%, respectively, by weight with 1% by weight of a coloring agent added,
   said silica flour comprising equal parts by weight of 140 mesh, 200 mesh and 325 mesh material
   mixing together by weight approximately 80% of a coreactant and approximately 20% of a phenol mixture to form a hardener material, and
   mixing said resin material mixture with said hardener material in a proportion of approximately 50%:50% by weight,
   said ester comprising a high boiling glycidyl ester of tertiary, saturated carbon-chain substituted, carboxylic acid, having an epoxide equivalent weight of 240 to 250,
   said first resin comprising an epochlorohydrin/bisphenol A liquid resin having an epoxide equivalent weight in the range 182 to 194,
   said plasticizer comprising a mixture of the monoglycidyl ether derivatives of the $C_{15}$-alkyl phenols obtained from cashew nut liquid, having an epoxide equivalent weight of about 490,
   said second resin comprising an epichlorohydrin/bisphenol A liquid or solid resin having an epoxide equivalent weight of about 390 to 500, and
   said co-reactant comprising a very low viscosity, resinous amidoamine adduct having an amine value of about 450.

2. The process set forth in claim 1 wherein:
   said filler comprises silica flour and a coloring agent, and
   said resin material is mixed with said silica flour and said coloring agent to form said resin material mixture.

3. The process set forth in claim 1 wherein:
   said hardener material is mixed with silica flour and a colloid in a proportion of approximately 20%:78%:2% by weight, respectively, to form a hardener material mixture, and
   said resin material mixture and said hardener material mixture are mixed in a proportion of approximately 50%:50% by weight.

4. The process set forth in claim 1 wherein:
   said filler comprises cured rubber, silica flour and a coloring agent, and
   said resin material is mixed with said cured rubber, silica flour and a coloring agent in a proportion of approximately 50%:34%:14.5%:1.5% by weight, respectively, to form said resin material mixture,
   said hardener material is mixed with cured rubber and silica flour in a proportion of approximately 54%:31%:15% by weight, respectively, to form a hardener material mixture, and
   mixing said resin material mixture and said hardener mixture in a proportion of approximately 50%:50% by weight.

5. The process set forth in claim 1 wherein:
   said hardener material is mixed with cured rubber in a proportion of approximately 55%:45% by weight, respectively, to form a base hardener mixture, and
   mixing said resin material mixture and said hardener material mixture in a proportion of approximately 50%:50% by weight.

6. The process set forth in claim 1 wherein:
said filler comprises silica flour and a coloring agent, and
said resin material is mixed with said silica flour and said coloring agent in a proportion of approximately 27%:69%:4% by weight, respectively, to form said resin material mixture.

7. The product produced by the process of claim 1.
8. The product produced by the process of claim 2.
9. The product produced by the process of claim 3.
10. The product produced by the process of claim 4.
11. The product produced by the process of claim 5.
12. The product produced by the process of claim 6.

* * * * *